Feb. 28, 1950     B. J. M. JUNGERHANS     2,499,318
LIQUID COCK OR VALVE

Filed Dec. 6, 1945     2 Sheets-Sheet 1

Inventor
B. J. M. Jungerhans,
By E. J. Wenderoth
Attorney

Inventor
Bernardus J. M. Jungerhans,
By E. J. Wenderoth
Attorney

Patented Feb. 28, 1950

2,499,318

UNITED STATES PATENT OFFICE 2,499,318

LIQUID COCK OR VALVE

Bernardus Johannes Marie Jungerhans, Voorburg, Netherlands, assignor to Jan Jongerius N. V., Jutphaas, Utrecht, Netherlands Application December 6, 1945, Serial No. 633,195
In the Netherlands September 17, 1943

Section 1, Public Law 690, August 8, 1946
Patent expires September 17, 1963

3 Claims. (Cl. 277—8)

The invention relates to a composite liquid cock or valve serving to control the supply and the discharge of liquid to and from one or more hydraulic motors adapted to be locked in adjusted positions, said valve comprising, in addition to a valve housing provided with ducts for connecting the motor conduits and the conduits leading to and from a pump or like device, a plug rotatably mounted within said housing and provided with passages and ports for establishing connections between the pump ducts and the motor ducts selected by rotation of the plug. Many designs of multi-way plug valves of this type are already known. These known valves, however, are not capable of completely locking hydraulic motors operating at very high pressures, e. g. pressures exceeding 50 atmospheres. Such a complete lock is required, inter alia, in hydraulic lifting cylinders.

The invention has for its object to provide a cock permitting to reliably close the liquid conduits even when the liquid pressure is very high. The invention consists in this, that each motor duct is provided with a check valve, preferably a ball valve, seating in the direction towards the plug, and that said plug has an individually controlled device for lifting the check valve in the selected motor duct, which is to be connected to the suction conduit of the pump. In such a valve device, the plug only serves to select the path of the liquid, whereas the locking operation is carried out by the check valves.

Assuming the required liquid pressure to be produced by a continuously driven pump of the kind, which locks itself when its pressure conduit is closed, it is necessary to open a bye-pass allowing the continuously supplied liquid to be discharged when the supply and the discharge conduits of all motors are closed. To that end, the valve plug can be provided with a supply passage permanently communicating with the connecting duct for the pressure conduit of the pump, and with a discharge passage permanently communicating with the connecting duct for the suction conduit of the pump, said supply passage and said discharge passage being interconnected by a third passage provided with a valve closed simultaneously with, or in behalf of, the operation of the check valve lifting device.

According to the invention, the selected check valve may be lifted mechanically or hydraulically. The valve may be lifted mechanically by means of a dog, which may be operated, for instance by means of the lever for turning the plug. In order that it may be lifted hydraulically, the dog may be connected to a piston, which on one side is exposed to the pressure of the liquid in the supply passage, and on the other side to the pressure of the liquid in the discharge passage of the plug. The closure of the connecting passage produces a difference of pressure, whereby the piston is actuated.

According to the invention, the cock may advantageously be constituted in such a manner, that the motor ducts are arranged within the valve housing in a circular series around the plug, the check valves being adapted to move in radial directions and be lifted by a radially extending dog, slidably mounted in the valve plug.

In order to elucidate the invention, reference is had to the drawing, which illustrates, by way of example, two embodiments thereof; in the drawing.

Figure 1:
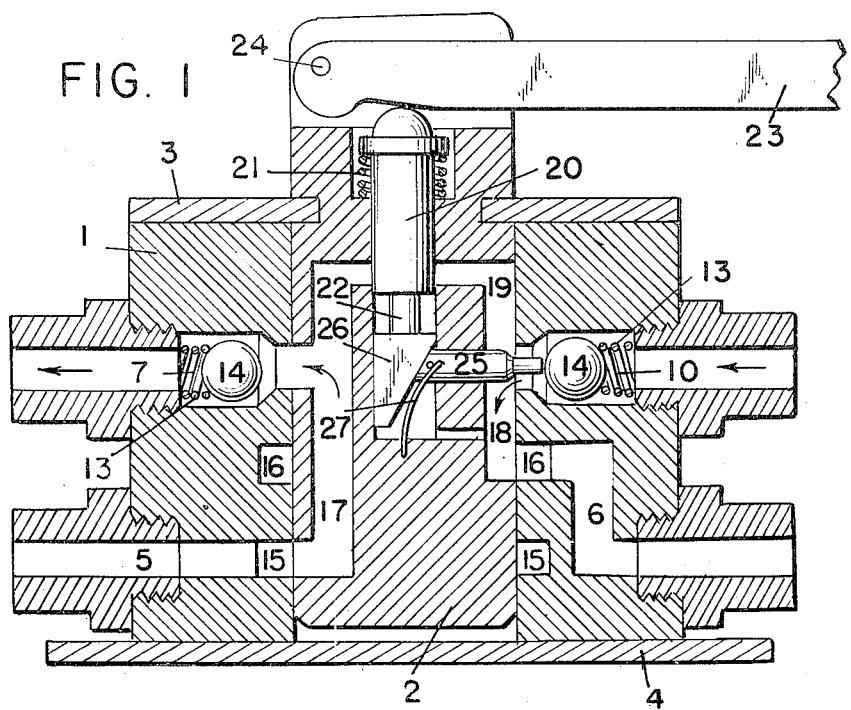
Fig. 1 is an axial, sectional view of one embodiment of the invention.
Figure 2:
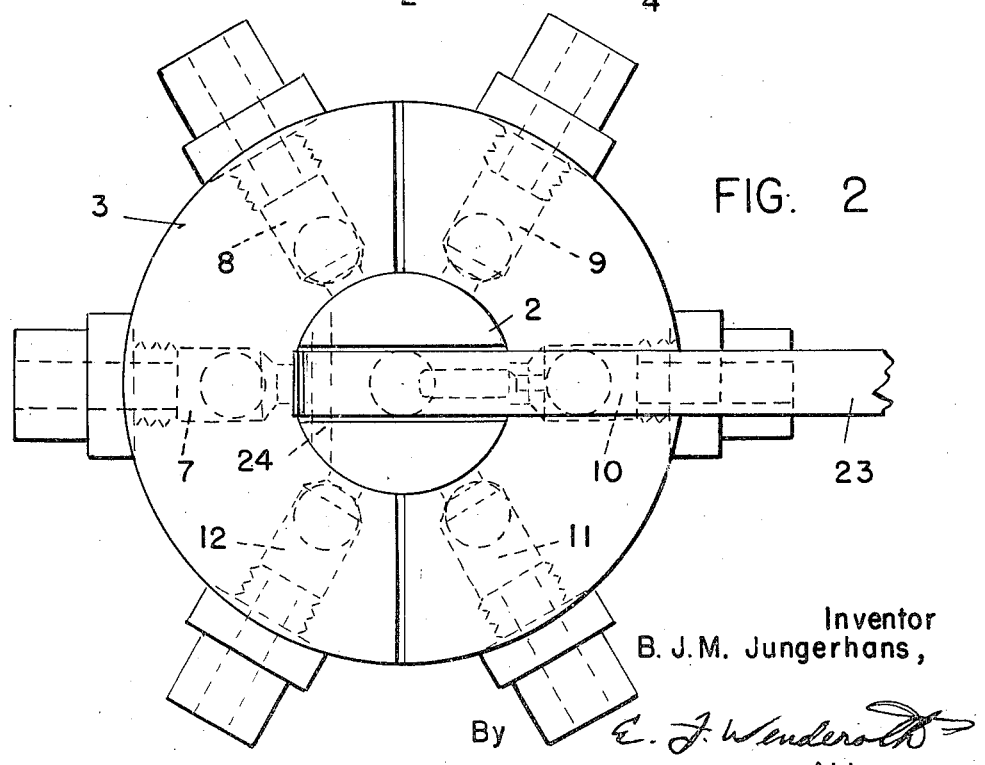
Fig. 2 is a plan view of the valve according to Fig. 1.

The liquid valve as shown in Figs. 1 and 2 consists of a valve housing 1, in which a plug 2 is rotatably mounted. The plug is confined between a cover plate 3, composed of two or more parts, and a bottom plate 4. Said housing is provided with two ducts 5 and 6 for connecting a through conduit for the pump, and with six ducts 7, 8, 9, 10, 11 and 12, which are arranged in a circle around the plug and destined for connecting the conduits leading to and from three hydraulic motors (not shown), e. g. double acting cylinders provided with pistons. The conduits appertaining to one and the same motor are connected to the valve housing in points diametrically opposite each other. Mounted in each duct for the connection of a motorconduit is a ball 14 loaded by a spring 13 and constituting, in conjunction with a seat a check valve seating in a direction towards the plug. The pump ducts 5 and 6 open into annular channels 15 and 16, respectively.

Provided within the plug is a liquid supply passage 17 permanently communicating with the annular groove 15 and adapted to be connected selectively to any one of the six motor ducts, and a liquid exhaust passage 18 permanently communicating with the annular groove 16 and adapted to be connected to the duct situated diametrically opposite the selected motor duct. The passages 17 and 18 are interconnected by a third passage 19 adapted to be closed by a slide valve 20. Said valve is mounted for axial movement in the axis of the plug and is loaded by a spring 21 tending to move the annular groove 22 of the slide valve into register with the connecting passage 19 so as to open the latter. With a view to closing the connecting passage 19, the slide valve can be moved against the thrust of the spring 21, by means of a lever 23 also serving for turning the plug (Fig. 1). To that end, said lever is hinged to the plug by a transverse pin 24. Mounted within the plug is a radially slidable dog 25, by means of which the ball valve in the discharge conduit of the selected hydraulic motor can be lifted. The dog is forced radially outward, when slide valve 20 is moved downward and the connecting passage 19 is closed. For that purpose the slide valve is bevelled at its lower end 26, said end cooperating with the bevelled end of the dog. The latter is retracted by a spring 27, as soon as the lever is released.

When the connecting passage 19 is closed, the dog is projected, so that the check valve in the duct for connecting the discharge conduit of the selected motor is opened, thus permitting the liquid to flow from said conduit through exhaust passage 18, annular groove 16 and duct 6 to the suction side of the pump. Also, the pressure in the passage 17 will exceed that in the motor duct 7 and the check valve 14 in said duct will be opened, allowing the selected hydraulic motor to be supplied with liquid under pressure.

If the lever is released, the connecting passage 19 is opened, the dog is retracted and the ball valves 14 closed. The hydraulic motors are then locked in their adjusted positions, since liquid can neither flow to, nor from the same.

If the hydraulic motor is to be reversed, the plug, with its lever 23 pointing in an upwardly inclined direction, is turned through 180°, whereupon the lever 23 is again pushed down.

Figure 3:
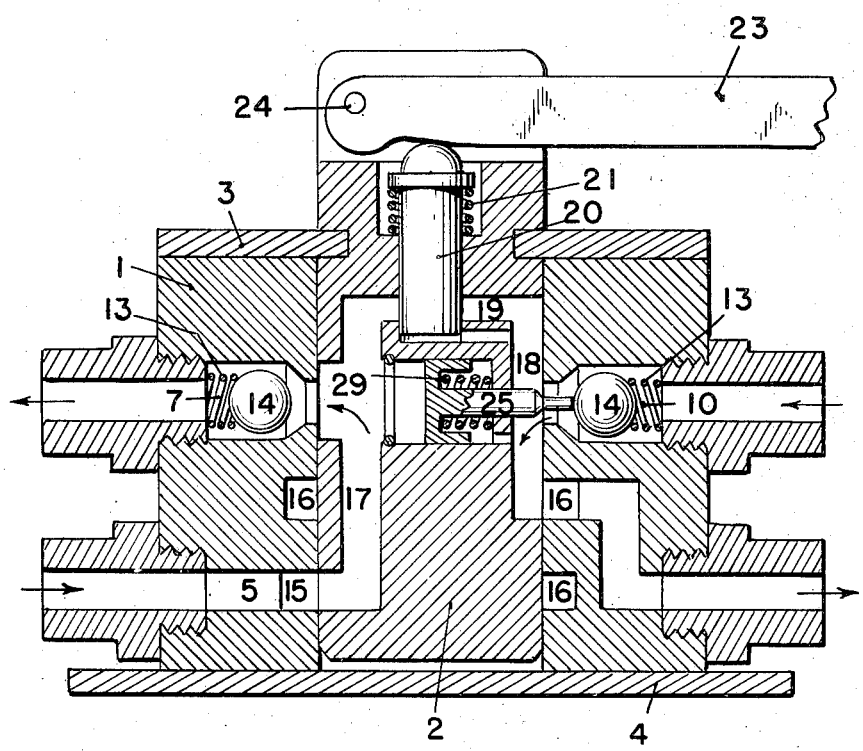
Fig. 3 is an axial, sectional view of a second embodiment.

The cock as shown in Fig. 3 differs from that according to Figs. 1 and 2 only in this, that the dog is forced out hydraulically, instead of mechanically, as soon as the slide valve 20 closes the connecting passage 19 so that the pressure in the introductory passage 17 increases. To that end, the dog 25 is attached to a piston 28, one side of which is exposed to the pressure of the liquid in the supply passage 17, the other side being exposed to the pressure of the liquid in the discharge passage 18. The piston is loaded by a spring 29 tending to retract the dog. The piston face should be larger than the opening of the check valve to be lifted. Moreover, the piston should be capable of comprising the springs 13 and 29 when the pressure has its normal operating value. It will be apparent, that the dog will be forced out during the closure of the connecting passage 19 and retracted during the opening of said passage. The proper positions of the plug may be made visible by an indicator and/or to be felt by a snap-action device.

Within the scope of the invention many details may be designed and arranged otherwise. It is not necessary to employ a slide valve in order to close and to open the connecting passage; a poppet valve for instance a conical valve, may be used instead. Nor is it necessary for the rotation of the plug and the control of the valve in the connecting passage to be carried out by means of a common lever.

What I claim is:

1. A composite liquid cock serving to control the supply and the discharge of liquid to and from at least one double-acting hydraulic motor adapted to be locked in its adjusted position, said cock comprising, in combination, a valve and plug housing, a plug rotatably mounted within said housing, two annular grooves provided in said housing and opening towards said plug, a connecting duct provided in said housing, said duct permanently communicating with one of said grooves and serving for the connection of the pressure conduit of a pump, a second connecting duct in said housing permanently communicating with the other said annular groove and serving for the connection of the suction conduit of the pump, an even number of motor ducts arranged in said housing in a circular series around said plug, each pair of said motor ducts, which serve for the connection of the two conduits leading to the said hydraulic motor, opening by diametrically arranged ports toward said plug, check valves provided within the motor ducts and seating towards said plug, said check valves being adapted to be moved in radial directions, a supply passage provided in said plug, said passage permanently communicating with the said supply annular groove, an exhaust passage provided in said plug, said passage permanently communicating with the said exhaust groove, two diametrically arranged ports in said plug, said ports being adapted to cooperate with the ports by which the motor ducts open towards the plug, one of said ports communicating with said supply passage and the other with said exhaust passage, a third passage in said plug, said passage interconnecting said supply passage and said exhaust passage, a valve provided within said third passage, said valve being arranged to be controlled from the outside, a radially slidable spring loaded dog being mounted within said plug and adapted to be projected against the action of said spring through the port communicating with said exhaust passage and through the port of one of the motor ducts in order to lift the check valve in said duct and means for operating said check-valve-lifting-dog when said valve in the third plug passage is closed.

2. A composite liquid cock as claimed in claim 1, in which the valve provided within said third plug passage is shaped as a control pin operable from the outside and slidably mounted in a longitudinal bore in the plug, said control pin having a bevelled part adapted to be pushed against a bevelled part of the check-valve-lifting-dog so as to move said dog radially outwards against the action of a spring.

3. A composite liquid cock as claimed in claim 1, in which a piston is attached to the check-valve-lifting-dog, the active surface of said piston being larger than the cross sectional area of the opening of each check valve, one face of said piston being exposed to the liquid pressure in said exhaust passage and the other to the liquid pressure in said supply passage.

BERNARDUS JOHANNES MARIE JUNGERHANS.

REFERENCES CITED

The following references are of record in the file of this patent:

UNITED STATES PATENTS

| Number | Name | Date |
| --- | --- | --- |
| 2,308,727 | Temple | Jan. 19, 1943 |
| 2,342,770 | Temple | Feb. 29, 1944 |
| 2,360,987 | Temple | Oct. 24, 1944 |
| 2,408,680 | Pontius | Oct. 1, 1946 |

FOREIGN PATENTS

| Number | Country | Date |
| --- | --- | --- |
| 510,916 | Great Britain | Aug. 10, 1939 |